(12) United States Patent
Choi et al.

(10) Patent No.: US 10,756,353 B2
(45) Date of Patent: Aug. 25, 2020

(54) METHOD OF MANUFACTURING ELECTRODE FOR THIN REDOX FLOW BATTERY

(71) Applicant: CNF Co., Ltd., Jeonju-si, Jeollabuk-do (KR)

(72) Inventors: Woo Cheal Choi, Gimhae-si (KR); Kook Hun Yoon, Jeollabuk-do (KR); Woong Hwi Choi, Jeollabuk-do (KR)

(73) Assignee: CNF Co., Ltd., Jeonju-si, Jeollabuk-do (KR)

( * ) Notice: Subject to any disclaimer, the term of this patent is extended or adjusted under 35 U.S.C. 154(b) by 179 days.

(21) Appl. No.: 16/028,358

(22) Filed: Jul. 5, 2018

(65) Prior Publication Data

US 2020/0014036 A1 Jan. 9, 2020

(30) Foreign Application Priority Data

Jul. 3, 2018 (KR) ........................ 10-2018-0077035

(51) Int. Cl.
*H01M 4/88* (2006.01)
*H01M 4/96* (2006.01)
*H01M 8/18* (2006.01)

(52) U.S. Cl.
CPC ........... *H01M 4/8803* (2013.01); *H01M 4/96* (2013.01); *H01M 8/188* (2013.01)

(58) Field of Classification Search
CPC .............. H01M 4/88; H01M 4/98; H01M 8/18
See application file for complete search history.

(56) References Cited

U.S. PATENT DOCUMENTS

2017/0133701 A1* 5/2017 Kout .................... H01M 8/188

FOREIGN PATENT DOCUMENTS

| KR | 10-2010-0122711 A | 11/2010 |
| KR | 10-2016-0132256 A | 11/2016 |
| KR | 10-1865057 B1 | 6/2018 |

OTHER PUBLICATIONS

Machine Translation of: Park et al., (KR 10-1865057), Jun. 8, 2018.*

* cited by examiner

*Primary Examiner* — Kenneth J Douyette
(74) *Attorney, Agent, or Firm* — Revolution IP, PLLC (57) ABSTRACT

A method of manufacturing an electrode for a thin redox flow battery includes: preparing a bundle of carbon fibers and carbon fiber felt; making a support layer in which carbon fibers are arranged in one direction by spreading the bundle of carbon fibers by needle punching; placing the carbon fiber felt on the support layer; performing the needle punching on the carbon fiber felt; gradually compressing, by a needle, the carbon fiber felt while repeatedly penetrating the carbon fiber felt in order to form a flow path in an upper surface of the carbon fiber felt in a direction in which an electrolyte flows; and further forming the other flow paths, which are in parallel with the flow path, in the carbon fiber felt by repeating the fifth step.

3 Claims, 8 Drawing Sheets

METHOD OF MANUFACTURING ELECTRODE FOR THIN REDOX FLOW BATTERY

ACKNOWLEDGEMENTS

This research was also supported by the following National Research and Development Project sponsored by the Ministry of Trade, Industry and Energy.
[National research and development project supporting this invention]
[Assignment number] 20152000000350
[Government department] Ministry of Trade, Industry and Energy
[Research Management Institution] Korea Energy Technology Evaluation Institute
[Project name] Energy demand management core technology (energy technology development project)
[Research title] Development of manufacturing technology of thin and large area bipolar-electrode (over 3,000 cm$^2$) for VRFB
[Contribution Rate] 1/1
[Host organization] CNF Corporation
[Research Period] 2015.06.01~2018.08.31

CROSS-REFERENCE TO RELATED APPLICATIONS

This application claims the priority of Korean Patent Application No. 2018-0077035 filed on Jul. 3, 2018, in the Korean Intellectual Property Office, the disclosure of which is incorporated herein by reference.

BACKGROUND OF THE INVENTION

Field of the Invention

The present invention relates to a method of manufacturing an electrode for a redox flow battery.

Description of the Related Art

A redox flow battery refers to a rechargeable battery which is repeatedly charged and discharged by electrochemical reactions of an electrolyte. Vanadium, Zn—Br, or the like is used as the electrolyte used for the redox flow battery.

The redox flow battery is charged and discharged by circulating the electrolyte. The charge and the discharge are performed in stacks in which the electrochemical reactions including oxidation and reduction are performed, and electricity is stored in the electrolyte.

An output of the redox flow battery is determined by the number of stacks and sizes of the stacks, and an electric capacity is determined by the amount of electrolyte stored in a tank.

Because the electrolyte, which is stores electricity, can be used semipermanently, the redox flow battery environmentally-friendly and there is no risk of explosion.

It is important that the electrolyte does not come out of the electrode before the electrochemical reaction is sufficiently performed and it is important that the flow of the electrolyte is not stagnant in the electrode so that efficiency of the redox flow battery is consistently maintained.

To solve this problem, Korean Patent No. 10-1865057 in the name of the present applicant proposes a method of manufacturing an electrode for a redox flow battery, which forms multiple flow paths in carbon fiber felt, in a direction in which an electrolyte flows, by using needle punching, thereby allowing the electrolyte to smoothly flow along the flow paths. According to the method of manufacturing an electrode for a redox flow battery, the flow paths are formed by performing the needle punching on the carbon fiber felt which has a thickness of 0.1 to 1 mm and is placed on a thermoplastic resin mesh having a thickness of 0.1 to 2.0 mm, and the mesh serves to support the flow paths so that the shapes of the flow paths are maintained.

Meanwhile, it is possible to produce a larger amount of electricity by reducing a thickness of the electrode for a redox flow battery and stacking a larger number of unit cells in the same space.

However, actually, it is very difficult to manufacture the mesh having a thickness of less than 1 mm because the mesh disclosed in Korean Patent No. 10-1865057 is made of thermoplastic resin. For this reason, it is difficult to reduce a thickness of the electrode, which includes a thickness of the carbon fiber felt and a thickness of the mesh, to less than 1 mm.

Meanwhile, Korean Patent No. 10-1865057 discloses the method which forms the flow paths in an upper surface of the carbon fiber felt by performing the needle punching on the carbon fiber felt placed on the mesh, and then couples the carbon fiber felt and the mesh, and as a result, a needle collides with the hard mesh and thus is often broken, and the broken needle hides in the carbon fiber felt and thus causes a breakdown of the redox flow battery.

DOCUMENT OF RELATED ART

Patent Document

Korean Patent No. 10-1865057

SUMMARY OF THE INVENTION

An aspect of the present invention provides a new concept method of manufacturing an electrode for a thin redox flow battery, which may solve all of the aforementioned problems.

According to an aspect of the present invention, there is provided a method of manufacturing an electrode for a thin redox flow battery, the method including: a first step of preparing a bundle of carbon fibers and carbon fiber felt; a second step of making a support layer in which carbon fibers are arranged in one direction by spreading the bundle of carbon fibers by needle punching; a third step of placing the carbon fiber felt on the support layer; a fourth step of performing the needle punching on the carbon fiber felt so that carbon fibers in the carbon fiber felt are drawn downward to tie together the carbon fibers in the support layer so that the carbon fibers in the support layer are not scattered to the left and right; a fifth step of gradually compressing, by a needle, the carbon fiber felt while repeatedly penetrating the carbon fiber felt in order to form a flow path in an upper surface of the carbon fiber felt in a direction in which an electrolyte flows; and a sixth step of further forming the other flow paths, which are in parallel with the flow path, in the carbon fiber felt by repeating the fifth step.

BRIEF DESCRIPTION OF THE DRAWINGS

The above and other aspects, features and other advantages of the present invention will be more clearly understood from the following detailed description taken in conjunction with the accompanying drawings, in which.

DETAILED DESCRIPTION OF THE PREFERRED EMBODIMENT

Exemplary embodiments of the present invention will now be described in detail with reference to the accompanying drawings.

Hereinafter, a method of manufacturing an electrode for a thin redox flow battery according to an exemplary embodiment of the present invention will be described in detail.

Figure 1:
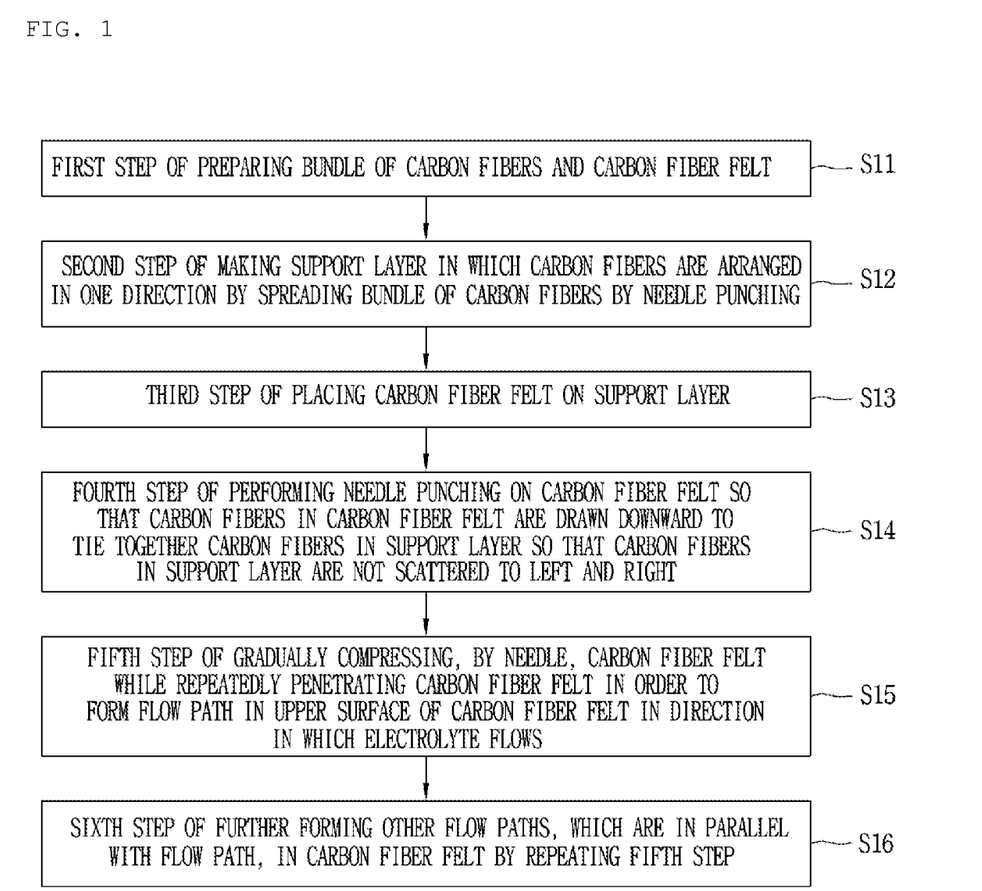
FIG. 1 is a flowchart illustrating a method of manufacturing an electrode for a thin redox flow battery according to an exemplary embodiment of the present invention.

As illustrated in FIG. 1, the method of manufacturing an electrode for a thin redox flow battery according to the exemplary embodiment of the present invention includes: a first step S11 of preparing a bundle of carbon fibers and carbon fiber felt; a second step S12 of making a support layer in which carbon fibers are arranged in one direction by spreading the bundle of carbon fibers by needle punching; a third step S13 of placing the carbon fiber felt on the support layer; a fourth step S14 of performing the needle punching on the carbon fiber felt so that carbon fibers in the carbon fiber felt are drawn downward to tie together the carbon fibers in the support layer so that the carbon fibers in the support layer are not scattered to the left and right; a fifth step S15 of gradually compressing, by a needle, the carbon fiber felt while repeatedly penetrating the carbon fiber felt in order to form a flow path in an upper surface of the carbon fiber felt in a direction in which an electrolyte flows; and a sixth step S16 of further forming the other flow paths, which are in parallel with the flow path, in the carbon fiber felt by repeating the fifth step.

The first step S11 will be described.

Figure 2:
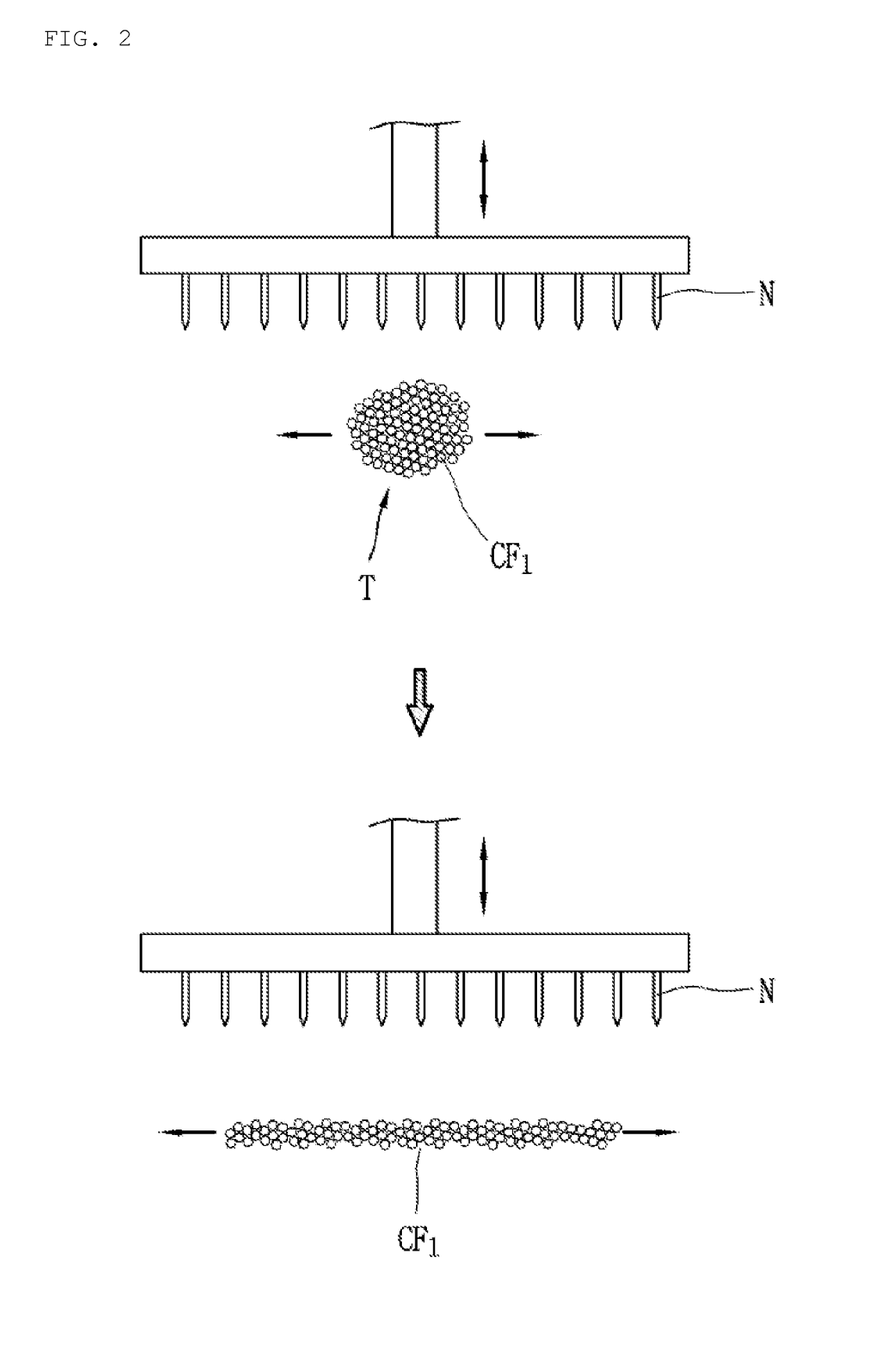
FIG. 2 is a view illustrating a state in which a bundle of carbon fibers is spread to the left and right by needle punching.

As illustrated in FIG. 2, a bundle T of carbon fibers is prepared. The bundle T of carbon fibers has a tow shape in which long carbon fibers CF1 are arranged and joined in one direction. The carbon fibers CF1 are configured by several tens to several hundreds of carbon fiber filaments, and have a diameter of 0.1 to 0.2 mm. To prevent the drawings from being complicated, the carbon fiber filaments are omitted in FIGS. 2 to 12.

Figure 3:
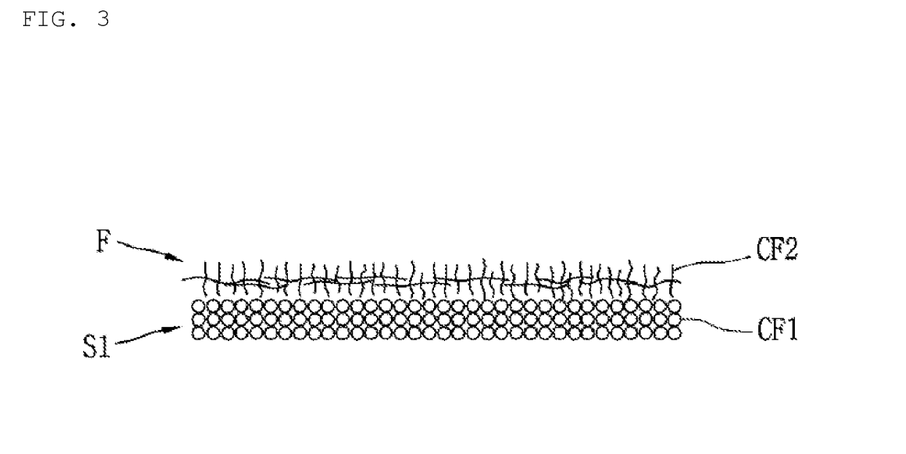
FIG. 3 is a view illustrating a state in which carbon fiber felt is placed on a support layer formed by arranging, in one direction, unit groups formed by stacking several to several tens of strands of carbon fibers.

As illustrated in FIG. 3, carbon fiber felt F is prepared. The carbon fiber felt F is made by randomly combining short carbon fibers CF2. The carbon fiber felt F has a thickness of 0.1 to 1 mm.

A surface density of the carbon fiber felt F may be 10 $g/m^2$ to 300 $g/m^2$. More particularly, the surface density of the carbon fiber felt F may be 50 $g/m^2$ to 200 $g/m^2$.

The reason is that if the surface density of the carbon fiber felt F is less than 10 $g/m^2$, the flow path may not play the role because the carbon fiber felt F absorbs the electrolyte and durability of the carbon fiber felt F greatly deteriorate, and if the surface density of the carbon fiber felt F is more than 300 $g/m^2$, it is difficult to manufacture thin carbon fiber felt F and material costs are increased.

The second step S12 will be described.

As illustrated in FIG. 2, when needles N repeatedly punch the bundle T of carbon fibers, intervals between the carbon fibers CF1, which constitute the bundle T of carbon fibers, are gradually increased, such that the bundle T of carbon fibers is spread.

Figure 4:
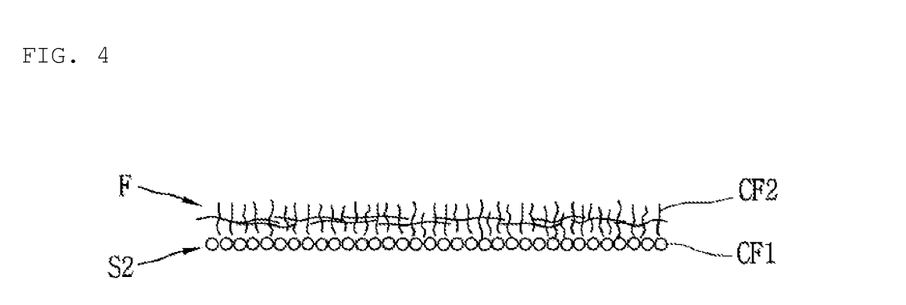
FIG. 4 is a view illustrating a state in which carbon fiber felt is placed on a support layer formed by arranging strands of carbon fibers in a row in one direction.

A support layer S1 or S2 illustrated in FIG. 3 or 4 is made as the bundle T of carbon fibers is spread by the needle punching. Here, the needle punching may be performed in a state in which both ends of the bundle T of carbon fibers are not restricted, but the needle punching may be performed on a middle portion of the bundle T of carbon fibers in a state in which both ends of the bundle T of carbon fibers are held by a jig in order to prevent the carbon fibers CF1 from being scattered during the needle punching.

As illustrated in FIG. 3, according to the number of times of the needle punching, the support layer S1 may be formed, in which unit groups made by stacking several to several tens of strands of carbon fibers CF1 are arranged in one direction. In this case, a thickness of the support layer S1 is a multiple of a diameter of the carbon fiber CF1.

As an example, the unit group illustrated in FIG. 3 includes three strands of carbon fibers CF1 stacked vertically.

Since the diameter of one strand of carbon fiber CF1 is 0.1 to 0.2 mm, a thickness of the support layer S1, in which the three strands of carbon fibers CF1 are stacked vertically, is 0.3 to 0.6 mm which is three times the diameter 0.1 to 0.2 mm of the carbon fiber CF1.

As another example, in a case in which the unit group includes four strands of carbon fibers CF1 stacked vertically, a thickness of the support layer S1 is 0.4~0.8 mm which is four times the diameter (0.1 to 0.2 mm) of the carbon fiber CF1.

According to the present invention as described above, it is possible to easily adjust the thickness of the support layer S1 by adjusting the number of carbon fibers CF1 to be stacked vertically.

Meanwhile, a degree to which the bundle T of carbon fibers is spread is gradually increased as the number of times of the needle punching is increased, and as a result, as illustrated in FIG. 4, even the support layer S2 may be formed, in which the strands of carbon fibers CF2 are arranged in a row in one direction. In this case, a thickness of the support layer S2 is 0.1 to 0.2 mm equal to the diameter (0.1 to 0.2 mm) of the carbon fiber CF2. Therefore, the thickness of the support layer S2 may be reduced to the diameter of one strand of carbon fiber CF2.

Hereinafter, in the descriptions related to the third to sixth steps S13 to S16, a method of forming a flow path P1 in an upper surface of the carbon fiber felt F supported by the support layer S1 formed by arranging the unit groups illustrated in FIG. 3 in one direction and a method of forming a flow path P2 in an upper surface of the carbon fiber felt F supported by the support layer S2 formed by arranging the strands of carbon fibers CF2 illustrated in FIG. 4 in a row in one direction will be alternately described.

The third step S13 will be described.

As illustrated in FIG. 3, the carbon fiber felt F is placed on the support layer S1. Since the support layer S1 is formed by arranging, in one direction, the unit groups in which several to several tens of strands of high-strength carbon fibers are stacked, it is possible to support a flow path (P1, see FIG. 9), even with a thickness smaller than a thickness of the thermoplastic mesh in the related art, so that the flow path P1 is not collapsed. In addition, since the carbon fibers CF1 of the support layer S1 are arranged in a row in a direction in which the electrolyte flows, and as a result, it is possible to guide the direction in which the electrolyte flows.

Meanwhile, as illustrated in FIG. 4, the carbon fiber felt F is placed on the support layer S2. Since the support layer S2 is formed by arranging the strands of high-strength carbon fibers in a row in one direction, it is possible to support a flow path (P2, see FIG. 10), even with a thickness much smaller than a thickness of the thermoplastic mesh in the related art, so that the flow path P2 is not collapsed. In addition, since the carbon fibers CF1 of the support layer S2 are arranged in a row in a direction in which the electrolyte flows, and as a result, it is possible to guide the direction in which the electrolyte flows.

The fourth step S14 will be described.

Figure 7:
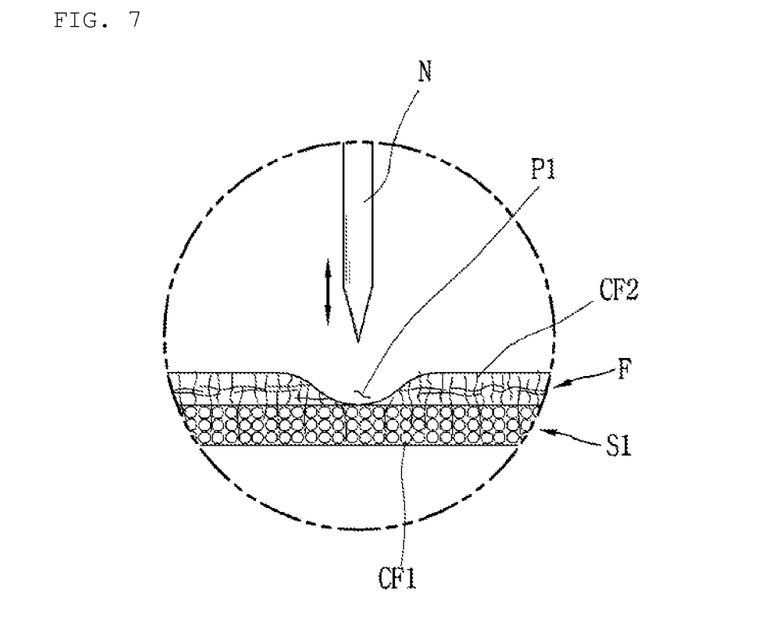
FIG. 7 is a view illustrating a state in which a flow path is formed at a particular site on an upper surface of the carbon fiber felt as a needle repeatedly penetrates and compresses the carbon fiber felt illustrated in FIG. 5.

To prevent the carbon fibers CF1 of the support layer S1, which are arranged in one direction without any restriction, from being scattered to the left and right during the process of forming the flow path P1 illustrated in FIG. 7, the carbon fibers CF1 in the support layer S1 are tied together by the carbon fibers CF2 in the carbon fiber felt F by performing the needle punching on the carbon fiber felt F illustrated in FIG. 3. To this end, the needle punching is performed on the carbon fiber felt F in places in the state in which the carbon fiber felt F is placed on the support layer S1.

Figure 5:
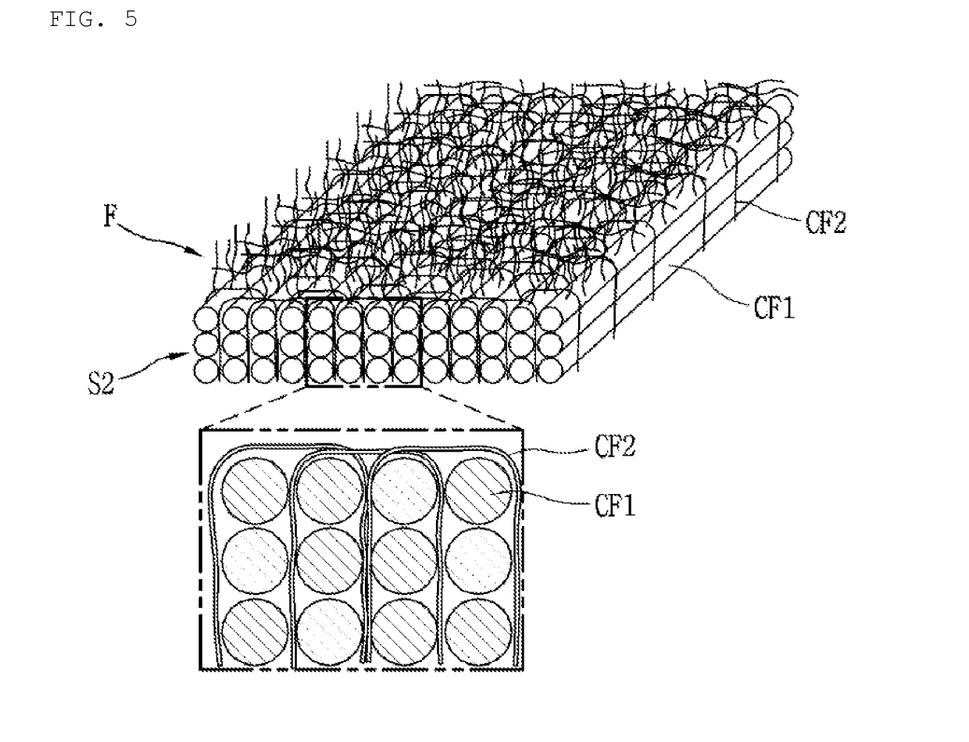
FIG. 5 is a view illustrating a state in which the carbon fibers, which are arranged in one direction in the support layer illustrated in FIG. 3, are tied together by carbon fibers in the carbon fiber felt which are drawn by the needle punching so that the carbon fibers in the support layer are not scattered to the left and right.

Then, as illustrated in FIG. 5, the carbon fibers CF2 in the carbon fiber felt F are drawn downward and tie together the carbon fibers CF1 in the support layer S1 so that the carbon fibers CF1 in the support layer S1 are not scattered to the left and right.

Figure 8:
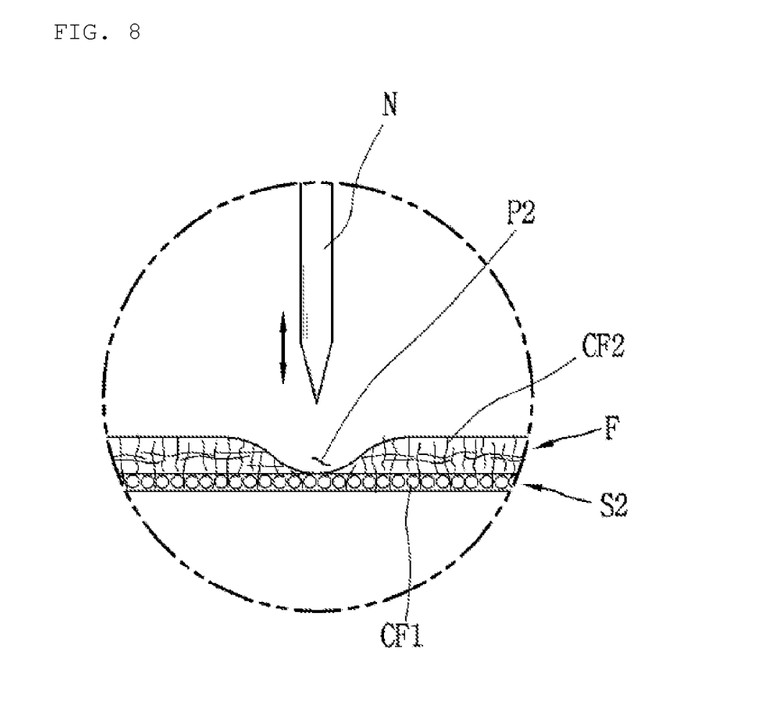
FIG. 8 is a view illustrating a state in which a flow path is formed at a particular site on an upper surface of the carbon fiber felt as a needle repeatedly penetrates and compresses the carbon fiber felt illustrated in FIG. 6.

Meanwhile, to prevent the carbon fibers CF1 of the support layer S2, which are arranged in one direction without any restriction, from being scattered to the left and right during the process of forming the flow path P2 illustrated in FIG. 8, the carbon fibers CF1 in the support layer S2 are tied together by the carbon fibers CF2 in the carbon fiber felt F by performing the needle punching on the carbon fiber felt F illustrated in FIG. 4. To this end, the needle punching is performed on the carbon fiber felt F in places in the state in which the carbon fiber felt F is placed on the support layer S2.

Figure 6:
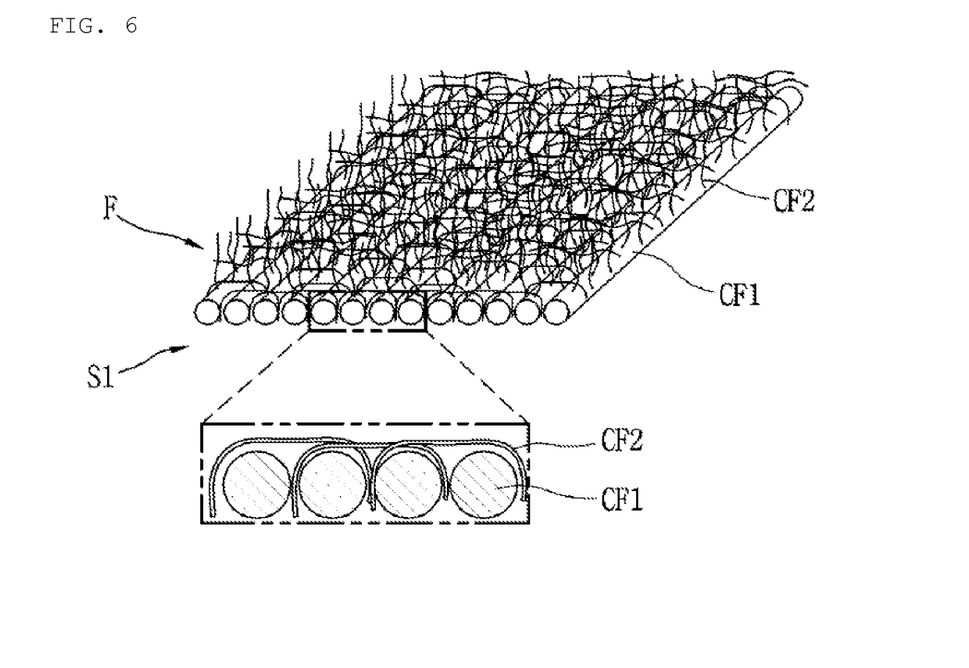
FIG. 6 is a view illustrating a state in which the carbon fibers, which are arranged in one direction in the support layer illustrated in FIG. 4, are tied together by carbon fibers in the carbon fiber felt which are drawn by the needle punching so that the carbon fibers in the support layer are not scattered to the left and right.

Then, as illustrated in FIG. 6, the carbon fibers CF2 in the carbon fiber felt F are drawn downward and tie together the carbon fibers CF1 in the support layer S2 so that the carbon fibers CF1 in the support layer S2 are not scattered to the left and right.

The fifth step S15 will be described.

Figure 11:
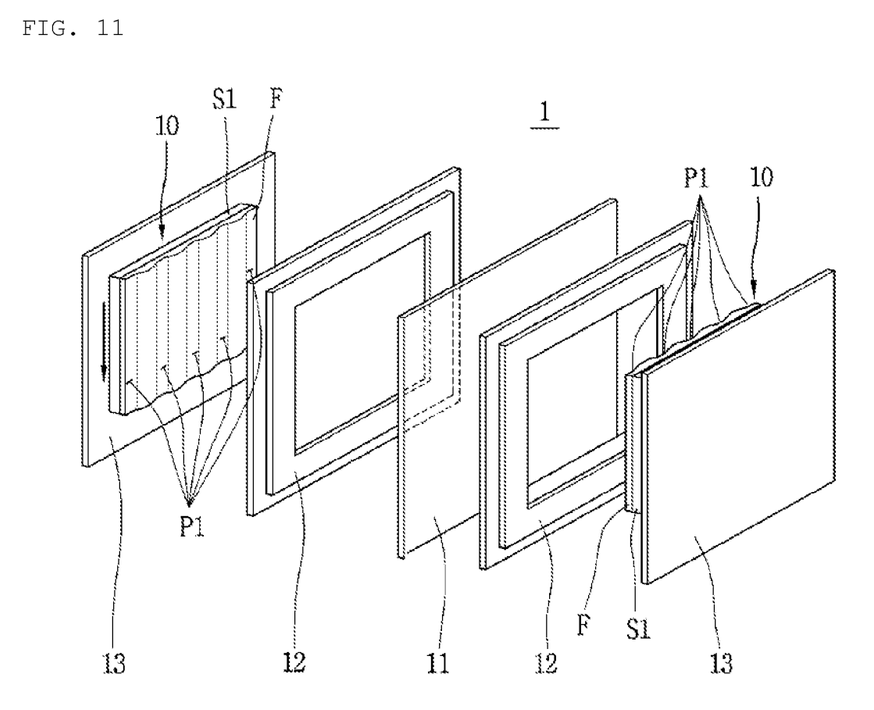
FIG. 11 is an exploded perspective view of a unit cell in which the electrodes for a redox flow battery illustrated in FIG. 9 are installed.

As illustrated in FIG. 7, the flow path P1 is formed in the upper surface of the carbon fiber felt F in the direction in which the electrolyte flows (in a direction indicated by the straight arrow illustrated in FIG. 11) by performing the needle punching on the carbon fiber felt F illustrated in FIG. 3. To this end, as illustrated in FIG. 7, the needle N gradually compresses a portion to be formed with the flow path P1 while repeatedly penetrating the carbon fiber felt F. The flow path P1 is formed at the portion compressed as described above. With the flow path P1 formed as described above, the electrolyte may smoothly flow along the flow path P1.

Figure 12:
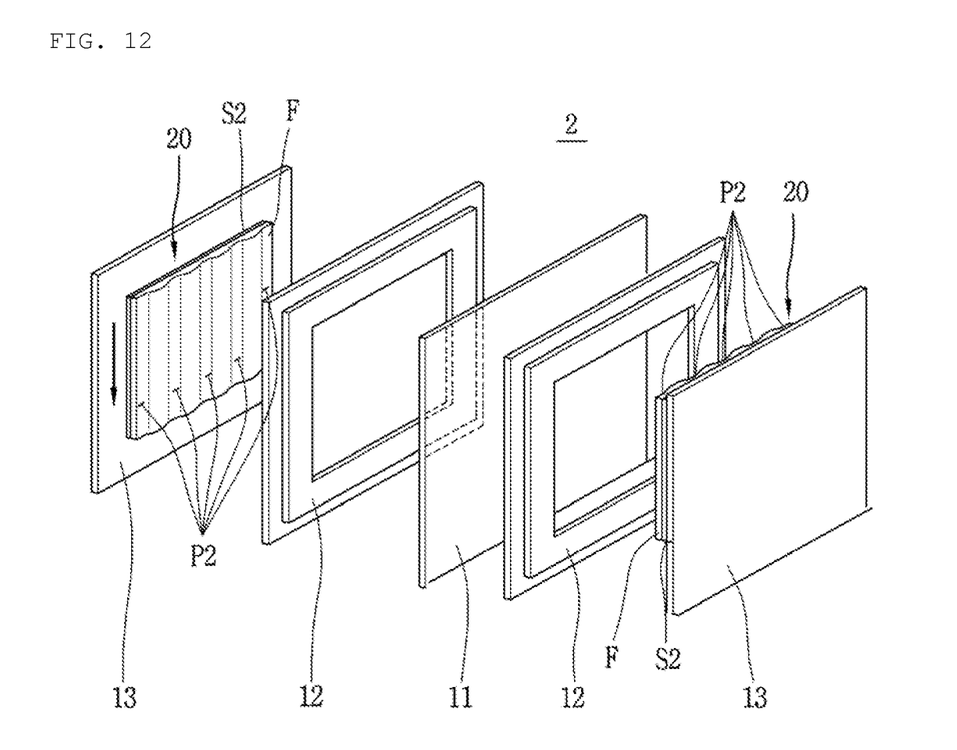
FIG. 12 is an exploded perspective view of a unit cell in which the electrodes for a redox flow battery illustrated in FIG. 10 are installed.

Meanwhile, as illustrated in FIG. 8, the flow path P2 is formed in the upper surface of the carbon fiber felt F in the direction in which the electrolyte flows (in a direction indicated by the straight arrow illustrated in FIG. 12) by performing the needle punching on the carbon fiber felt F illustrated in FIG. 4. To this end, as illustrated in FIG. 8, the needle N gradually compresses a portion to be formed with the flow path P2 while repeatedly penetrating the carbon fiber felt F. The flow path P2 is formed at the portion compressed as described above. With the flow path P2 formed as described above, the electrolyte may smoothly flow along the flow path P2.

Meanwhile, a degree to which the carbon fiber felt F is compressed may be adjusted by adjusting the number of times of the needle punching and a depth of the needle punching, and a depth of the flow path P1 or P2 may be adjusted in accordance with a degree to which the carbon fiber felt F is compressed. To adjust the depth of the flow path P1 or P2 for each step, the number of times of the needle punching may be 10 times/cm$^2$ to 300 times/cm$^2$. More particularly, the number of times of the needle punching may be 30 times/cm$^2$ to 150 times/cm$^2$.

Meanwhile, if the depth of the flow path P1 or P2 is too large, the electrolyte rapidly comes out along the flow path P1 or P2 even before the electrochemical reaction is sufficiently performed, and if the depth of the flow path P1 or P2 is too small, the electrolyte may not come out along the flow path P1 or P2 well. In consideration of the aforementioned condition, the depth of the flow path P1 or P2 may be ½ to ⅓ of the thickness of the carbon fiber felt F.

As described above, it is possible to easily form the flow path P1 even in the thin carbon fiber felt F having a small thickness of 1 mm or less by forming the flow path P by compressing the carbon fibers with the needle punching instead of forming the flow path P1 or P2 by cutting the carbon fiber felt F.

Meanwhile, a width w1 or w2 of the flow path P1 or P2 may be at least 1 mm or more by the needle punching, and a maximum width of the flow path P1 or P2 may be arbitrarily set. However, if the width w1 or w2 of the flow path P1 or P2 is too large, the electrolyte rapidly comes out along the flow path P1 or P2 even before the electrochemical reaction is sufficiently performed, and if the width w1 or w2 of the flow path P1 or P2 is too small, the electrolyte may not come out along the flow path P1 or P2 well. In consideration of the aforementioned condition, a maximum width of the width w1 or w2 of the flow path P1 or P2 may be determined.

The sixth step S16 will be described.

Figure 9:
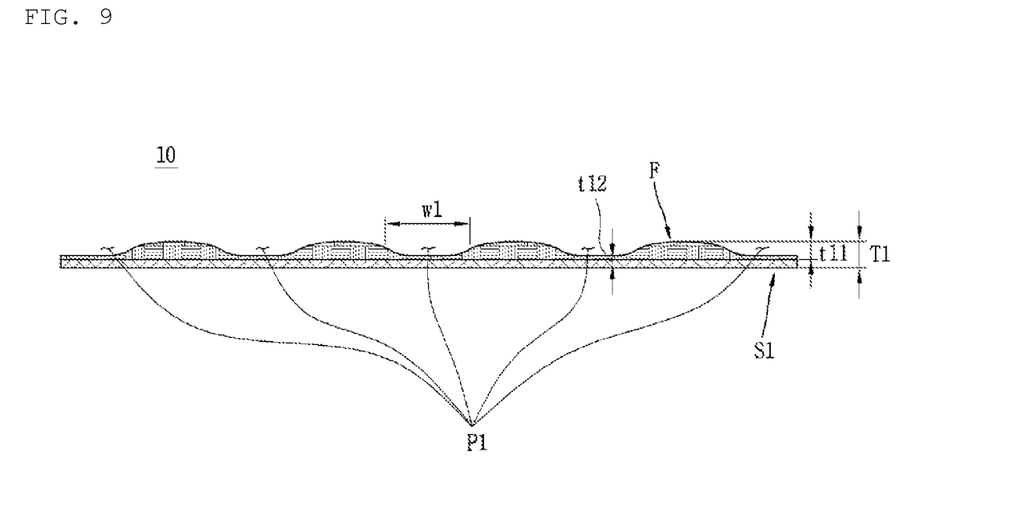
FIG. 9 is a view illustrating an electrode for a redox flow battery which is made to have multiple flow paths formed at predetermined intervals in the upper surface of the carbon fiber felt illustrated in FIG. 5.

Multiple other flow paths P1, which are in parallel with the flow path P1, are additionally formed in the carbon fiber felt F by performing the needle punching on the carbon fiber felt F as illustrated in FIG. 7, thereby finally manufacturing an electrode 10 for a redox flow battery as illustrated in FIG. 9. An interval between the flow paths P1 may be constant or may vary. In the present exemplary embodiment, the interval between the flow paths P1 is constant.

In FIG. 9, reference numeral T1 indicates a thickness of the electrode 10 for a redox flow battery, reference numeral t11 indicates a thickness of the carbon fiber felt F, and reference numeral t12 indicates a thickness of the support layer S1. Therefore, T1=t11+t12, t11 is within the range of 0.1 to 1 mm, and t12 starts from 0.3 to 0.6 mm (a height of three strands of stacked carbon fibers), and as a result, the electrode 10 for a redox flow battery may be made as a thin electrode having a thickness of at least 0.4 mm.

As illustrated in FIG. 11, the electrode 10 for a redox flow battery is cut to a predetermined size and installed in a unit cell 1.

The unit cell 1 includes an ion exchange membrane 11, spacers 12, bipolar plates 13, and the electrodes 10 for a redox flow battery. The straight arrow illustrated in FIG. 11 indicates a direction in which the electrolyte flows. A redox flow battery stack is made by arranging and connecting the multiple unit cells 1, and a redox flow battery is made by connecting the stack to an electrolyte tank.

Since the electrode 10 for a redox flow battery is thin, it is possible to produce a larger amount of electricity by stacking a larger number of unit cells in the same space.

Figure 10:
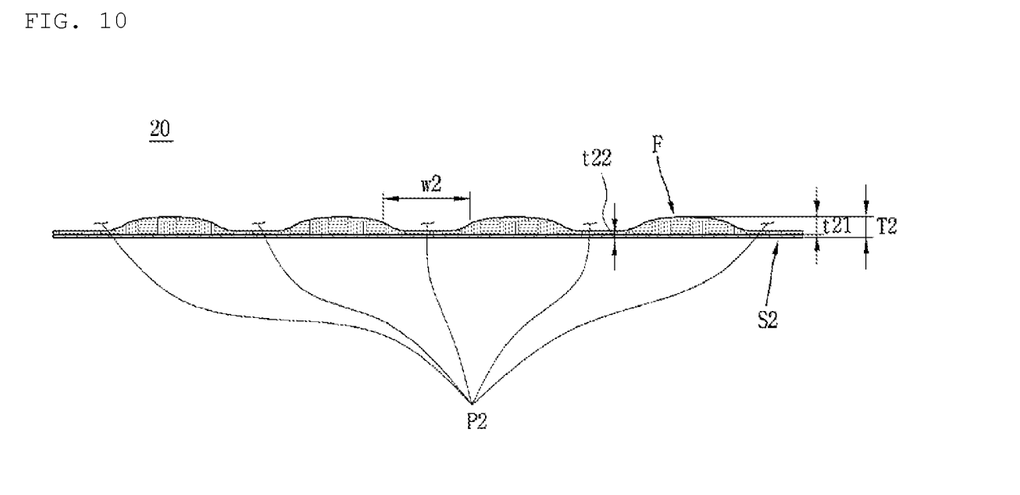
FIG. 10 is a view illustrating an electrode for a redox flow battery which is made to have multiple flow paths formed at predetermined intervals in the upper surface of the carbon fiber felt illustrated in FIG. 6.

Meanwhile, multiple other flow paths P2, which are in parallel with the flow path P2, are additionally formed in the carbon fiber felt F by performing the needle punching on the carbon fiber felt F as illustrated in FIG. 8, thereby finally manufacturing an electrode 10 for a redox flow battery as illustrated in FIG. 10. An interval between the flow paths P2 may be constant or may vary. In the present exemplary embodiment, the interval between the flow paths P2 is constant.

In FIG. 10, reference numeral T1 indicates a thickness of the electrode 20 for a redox flow battery, reference numeral t11 indicates a thickness of the carbon fiber felt F, and reference numeral t12 indicates a thickness of the support layer S2. Therefore, T1=t11+t12, t11 is within the range of 0.1 to 1 mm, and t12 starts from 0.1 to 0.2 mm (a diameter of one strand of carbon fiber), and as a result, the electrode 10 for a redox flow battery may be made as an ultrathin electrode having a thickness of at least 0.2 mm.

As illustrated in FIG. 12, the electrode 20 for a redox flow battery is cut to a predetermined size and installed in a unit cell 2.

The unit cell 2 includes an ion exchange membrane 11, spacers 12, bipolar plates 13, and the electrodes 20 for a redox flow battery. The straight arrow illustrated in FIG. 12 indicates a direction in which the electrolyte flows. A redox flow battery stack is made by arranging and connecting the multiple unit cells 2, and a redox flow battery is made by connecting the stack to an electrolyte tank.

Since the electrode 20 for a redox flow battery is ultrathin, it is possible to produce a larger amount of electricity by stacking a larger number of unit cells in the same space.

As set forth above, according to exemplary embodiments of the invention, the flow path is formed by performing the needle punching on the carbon fiber felt placed on the support layer formed by arranging, in one direction, the unit groups in which several to several tens of strands of high-strength carbon fibers are stacked, it is possible to support the flow path, with the thickness of 0.1 to 0.2 mm smaller than a thickness of the thermoplastic mesh in the related art, so that the flow path is not collapsed.

In addition, according to the present invention, the flow path is formed by performing the needle punching on the carbon fiber felt placed on the support layer formed by arranging the strands of high-strength carbon fibers in a row in one direction, it is possible to support the flow path, even with the thickness much smaller than a thickness of the thermoplastic mesh in the related art, so that the flow path is not collapsed. For this reason, a thickness of the electrode for a redox flow battery, which includes the thickness of the carbon fiber felt and the thickness of the support layer, may be reduced to ⅕ of a thickness of an electrode for a redox flow battery in the related art which uses the thermoplastic mesh, and as a result, it is possible to produce a larger amount of electricity by stacking a larger number of unit cells in the same space.

In addition, according to the present invention, instead of a lattice-type thermoplastic mesh, there is provided the support layer in which the carbon fibers are arranged in the direction in which the electrolyte flows, and as a result, the support layer may serve to guide the direction in which the electrolyte flows.

According to the present invention, instead of a hard thermoplastic mesh, there is provided the support layer including flexible carbon fibers, and as a result, the needle is not broken even though the needle punching is performed on the carbon fiber felt placed on the support layer. Therefore, it is possible to prevent a situation in which the needle collides with the hard mesh and thus is broken, and the broken needle hides in the carbon fiber felt, which causes a breakdown of a redox flow battery.

While the present invention has been shown and described in connection with the exemplary embodiments, it will be apparent to those skilled in the art that modifications and variations can be made without departing from the spirit and scope of the invention as defined by the appended claims.

What is claimed is:

1. A method of manufacturing an electrode for a thin redox flow battery, the method comprising:
   a first step of preparing a bundle of carbon fibers and carbon fiber felt;
   a second step of making a support layer in which carbon fibers are arranged in one direction by spreading the bundle of carbon fibers by needle punching, wherein a number of performing the needle punching is adjusted to control a width of the support layer, and to control a thickness of the support layer up to a diameter of a single carbon fiber at the lowest;
   a third step of placing the carbon fiber felt on the support layer;
   a fourth step of performing the needle punching on the carbon fiber felt so that carbon fibers in the carbon fiber felt are drawn downward to tie together the carbon fibers in the support layer so that the carbon fibers in the support layer are not scattered to the left and right;

a fifth step of compressing, by a needle of the needle punching, the carbon fiber felt while repeatedly penetrating the carbon fiber felt in order to form a flow path in an upper surface of the carbon fiber felt in a direction in which an electrolyte flows; and a sixth step of further forming, by the needle punching, the other flow paths, which are in parallel with the flow path, in the carbon fiber felt by repeating the fifth step, wherein all of the second step, the fourth step, the fifth step, and the sixth step are performed only by the needle punching.

2. The method of claim 1, wherein surface density of the carbon fiber felt is 10 $g/m^2$ to 300 $g/m^2$.

3. The method of claim 1, wherein a thickness of the carbon fiber felt is 0.1 to 1 mm.

* * * * *